United States Patent [19]

Hirota

[11] Patent Number: 5,013,348
[45] Date of Patent: May 7, 1991

[54] MOLD ASSEMBLY AND METHODS FOR PRODUCING MOLDED GLASS

[75] Inventor: Shinichiro Hirota, Hachioji, Japan

[73] Assignee: Hoya Corporation, Tokyo, Japan

[21] Appl. No.: 378,376

[22] Filed: Jul. 11, 1989

[30] Foreign Application Priority Data

Jul. 13, 1988 [JP] Japan .................. 63-174071

[51] Int. Cl.⁵ .............................. C03B 23/00
[52] U.S. Cl. ........................ 65/102; 65/275; 65/286; 65/374.13; 65/374.15
[58] Field of Search ............ 65/64, 102, 104, 244, 65/275, 286, 305, 308, 357, 359, 361, 374.13, 374.15

[56] References Cited

U.S. PATENT DOCUMENTS

| | | | |
|---|---|---|---|
| 3,244,497 | 4/1966 | Copeland | 65/308 |
| 4,696,692 | 9/1987 | Schmitt | 65/102 |
| 4,756,737 | 7/1988 | Yoshimura et al. | 65/275 |
| 4,778,505 | 10/1988 | Hirota et al. | 65/102 |
| 4,836,838 | 6/1989 | Hirota et al. | 65/308 |

FOREIGN PATENT DOCUMENTS

| | | | |
|---|---|---|---|
| 3443607 | 6/1985 | Fed. Rep. of Germany | 65/64 |
| 203732 | 11/1984 | Japan . | |
| 118641 | 6/1985 | Japan . | |
| 129220 | 7/1985 | Japan | 65/64 |
| 200833 | 10/1985 | Japan | 65/102 |
| 266322 | 11/1986 | Japan | 65/102 |
| 281030 | 12/1986 | Japan | 65/374.15 |
| 100429 | 5/1987 | Japan | 65/374.13 |
| 759460 | 9/1980 | U.S.S.R. | 65/374.13 |

Primary Examiner—Joye L. Woodard
Attorney, Agent, or Firm—Nixon & Vanderhye

[57] ABSTRACT

A mold assembly adapted for producing a molded glass in a relatively thin form has an upper mold and a lower mold. The lower mold carries thereon a glass to be molded during the heating, pressing and cooling of the glass to be molded. The lower mold has the maximal thickness below or equal to 1/10 of a diameter of the lower mold. A third ring-shaped mold having an annular recess along its interior surface receives the molded glass during pressing between the upper and lower molds to prevent sticking of the molded glass product to a mold surface when released from the mold assembly after pressing. Additionally, a stopper is used to contact the periphery of the ring-shaped mold to strip the molded glass product from the upper mold when the latter is moved upwardly during pressing the molded glass.

17 Claims, 5 Drawing Sheets

MOLD ASSEMBLY AND METHODS FOR PRODUCING MOLDED GLASS

BACKGROUND OF THE INVENTION

1. Field of the Invention

The present invention relates to a mold assembly for producing a thin molded glass article with a large diameter and which does not require after-processing such as polishing, and more particularly to a mold assembly adapted for producing an optical disc substrate with micropatterns such as microgrooves and micropits, and a lens having a large aperture such as a spectacle lens.

2. Description of the Related Art

JP-A-203732/1984 discloses a prior-art process for molding a glass article having a high accuracy and which process does not require after-processing such as polishing after a press working. In accordance with this molding process, a glass to be molded is heated and softened on a tray and then the resulting softened glass gripped with a gripper is transferred into a mold assembly which presses the softened glass. However, in accordance with this molding process, gripping the softened glass by the gripper, and separating the glass which has been softened and adhered to the tray both cause deformation of the softened glass, so that a subsequent pressing cannot provide a satisfactory lens.

JP-A-118641/1985 discloses another prior-art process comprising the steps of supporting a glass material to be molded on a ring-shaped mold, heating a combination of the ring-shaped mold and the glass material to be molded and softening the latter, moving said combination into an assembly of an upper mold or cope and a lower mold or drag, and pressing the glass material to be molded. This latter prior-art process has solved the problems in the first mentioned prior-art process. However, in the latter prior-art process, once the glass preform to be molded which has been supported on the ring-shaped mold is softened, the softened glass preform deforms by its weight, and as the result, the glass preform sags and falls from the ring-shaped mold. Since a central area of the glass preform is recessed during a heating operation, the top surface of the glass preform has a tendency to produce a gas trap. Thus, the range of the molding condition is narrow and the molding operation has been sometimes unstable. In particular, when a diameter of a molded glass product is large or a thickness of the molded glass product is small, a relatively thin glass preform must be used, so that the latter prior-art process prevents sagging of the heated glass preform only with great difficulty.

SUMMARY OF THE INVENTION

An object of the present invention is to overcome the above-described problems and provide a mold assembly which can produce a relatively thin molded glass product which has a large diameter.

In order to achieve this object, the present invention comprises a mold assembly which produces a thin molded glass product, said mold assembly comprising at least an upper mold and a lower mold, and the maximal thickness of the lower mold which carries a glass preform thereon so that the glass preform is heated, pressed and cooled in association with the lower mold, being below or equal to 1/10 of a diameter of the lower mold.

DESCRIPTION OF THE PREFERRED EMBODIMENTS

The glass material to be molded, i.e., a preform, is carried on the lower mold and heated so that at least part of a surface of the glass preform has a viscosity below or equal to $10^{10}$ poises. The upper mold, held at a temperature corresponding to a $10^{10}$ to $10^{13}$ poise glass viscosity, presses the heated glass preform. In this embodiment, the upper mold may be fixed and a load may be charged on the lower mold through a lower base in order to press the glass material.

The lower mold may be transferred by a suitable transfer means, but it is preferably transferred together with the glass preform by means of a ring-shaped mold the inner surface of which has a stepped portion or shoulder supporting the lower mold.

In addition, the inner surface of an intermediate portion of the ring-shaped mold may have an annular recess with a bore diameter providing a 50 to 100 $\mu$m bore diameter differential relative to an inner diameter of an upper portion of the ring-shaped mold, so that a sticking of the molded glass product on the upper mold is prevented when the molded glass product is released from the mold assembly after a press operation. In this embodiment, due to cooling, the molded glass is shrunk to a larger extent than the inner dimension of the ring-shaped mold, so that the diameter of the molded glass product becomes smaller than the inner diameter of the upper portion of the ring-shaped mold when the molded glass product is taken out, thereby the molded glass product can be freely released from the ring-shaped mold.

In addition, in order to prevent the combination of the molded glass product and the ring-shaped mold from sticking on the upper mold, a means for preventing the lifting of the ring-shaped mold may be provided. This preventing means may include a support fastening the ring-shaped mold, a gripper gripping the ring-shaped mold and a stopper brought into contact with the periphery of the ring-shaped mold. A suitable selection of molding conditions can eliminate the stick-preventing means or mechanism.

In addition, a molding surface of the upper mold or the lower mold preferably includes microgrooves or micropits.

The present invention is further described referring to Examples.

EXAMPLE 1

Example 1 of the present invention will be described hereinafter with reference to FIGS. 1 and 2.

Figure 1:
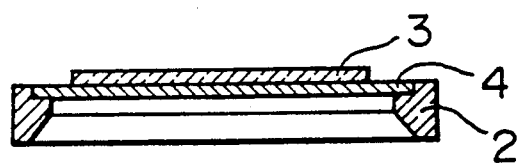
FIG. 1 is a sectional view through a mold assembly undergoing heating for producing an optical disc substrate according to Example 1 of the present invention.

FIG. 1 illustrates a condition in which a lower mold 4 of a mold assembly of this Example carries a glass to be molded thereon, i.e., a glass preform 3, and a ring 2 supports the lower mold 4. The lower mold 4 is relatively thin and the maximal thickness of the lower mold 4 is below or equal to 1/10 of a diameter of the lower mold 4. A molding surface of the lower mold 4 defines microgrooves and micropits thereon.

FIG. 1 illustrates a condition in which the glass preform 3 is heated. A heater (not shown) of a molded-glass producing apparatus surrounds the glass preform 3, the lower mold 4 and the ring 2. The ring 2 is supported by a suitable means (not shown) on a support portion of the molded-glass producing apparatus.

Figure 2:
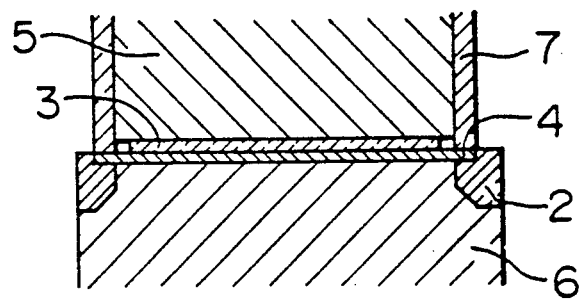
FIG. 2 is a sectional view through the mold assembly of FIG. 1 during pressing according to Example 1.

FIG. 2 illustrates a condition in which the glass preform 3 is pressed. In this condition, a lower base 6 is lifted up and fitted into the ring 2 to support the lower mold 4. On the other hand, the upper mold 5 and a stopper 7 descend so that the upper mold 5 depresses the glass preform 3.

A process for molding the glass preform will be described in detail. A molded glass produced by Example 1 is a pregrooved optical disc substrate having a 89 mm (3.5 inch) diameter and a 1.2 mm thickness. A corresponding pregroove having about an 1 μm breadth and about a 400 to 1,000 Å depth is defined. As a prior-art process for producing the pregrooved optical disc substrate, a plastic injection molding process and a process in which a thin plastic layer is formed on a glass have been tested and discussed. However, these prior-art processes cannot provide products having good performance. Therefore, a process for inexpensively producing the pregrooved optical disc substrate from a glass, which is most preferable in view of performance, has been desired. The present invention satisfies this expectation.

In accordance with Example 1, a molding surface of the lower mold 4, the shape of which corresponds to the glass to be molded, is provided by a method in which a quartz glass of 2 mm thickness that has been subjected to a surface polishing is coated by sputtering with about a 1,000 Å thick film made of chromium carbo-nitride; a groove with about a 1 μm breadth is formed in the film of the chromium carbo-nitride by photoetching; a surface of the resulting film with the groove is coated by sputtering with about a 500 Å thick film made of silicon carbide; and a surface of the resulting film of the silicon carbide is coated by sputtering with about a 500 Å thick hard carbon layer. On the other hand, a molding surface of the upper mold 5 is provided by a method in which a surface of a sintered silicon carbide is coated by CVD with a film made of silicon carbide and the resulting film is polished and then coated by sputtering with a 500 Å thick hard carbon layer.

The flat glass preform 3 is an aluminosilicate glass having a transition temperature of 500° C. The opposite surfaces of the flat glass preform 3 are roughly polished.

In molding, the glass preform 3 is first placed on the lower mold 4, and the combination of the glass preform 3 and the lower mold 4 is placed within the ring 2 and heated until the viscosity of the glass preform 3 becomes about $10^8$ poises. In this case, the combination of the glass preform 3 and the lower mold 4 is rapidly heated because the lower mold 4 is thin and has a low heat capacity. While maintaining temperatures of the upper mold 5 and the lower base 6 at 528° C. (a temperature at which the viscosity of the glass to be molded 3 becomes $10^{12}$ poises), the lower base 6 is lifted up and inserted into the ring 2 (made of a tungsten alloy) to support the lower mold 4, and then a spring or a double-acting cylinder moves a stopper 7 and the upper mold 5 downwards so that the stopper 7 and the upper mold 5 press under a 20 kg/cm$^2$ pressure for about 1 minute. During this pressing, heat in the glass preform 3 and the lower mold 4 is rapidly transferred to the upper mold 5 and the lower base 6 (in this Example, the lower base 6 is made of a sintered silicon carbide having a good thermal conductivity), because the glass preform 3 and the lower mold 4 are thin and have low heat capacities. As a result, the temperature of all of the elements become 528° C. (a temperature at which the viscosity of the glass becomes $10^{12}$ poises), so that the glass preform 3 is essentially solidified. Then, the stopper 7 depresses the periphery of the lower mold 4 and the upper mold 5 is elevated. During this time, the resulting molded glass does not adhere to the upper mold 5 and is retained on the lower mold 4, because the resulting molded glass has a higher adhesivity to the lower mold 4. Then, the stopper 7 is elevated and the lower base 6 is descended. Thereafter, all of the elements are cooled to or below 250° C. and the molded glass is taken out of the molded-glass producing apparatus together with the lower mold 4 or alone.

An observation of the resulting molded glass by means of a scanning electron microscope demonstrated that the lower surface of the resulting molded glass exactly copied a pattern of the microgrooves and the micropits defined in the lower mold 4; the top surface of the molded glass had a mirror surface having a surface roughness of 100 Å or below; both the top and bottom surfaces of the molded glass had a good surface accuracy; and a warpage was below or equal to 10 μm. The molded glass is reinforced by chemical ion-exchange method and then coated with a recording media to form an optical memory disc.

EXAMPLE 2

Figure 3:
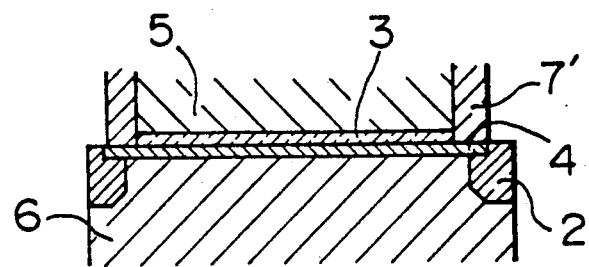
FIG. 3 is a sectional view through a mold assembly during pressing according to Example 2 of the present invention.

As shown in FIG. 3, the mold assembly of Example 2 is the same as that of Example 1 except that a stopper 7' serves as a ring-shaped mold in pressing. That is, since the side surface of the glass preform 3 is in contact with the stopper 7' in molding, a thickness of a resulting molded glass depends on an amount of the glass preform 3. On the other hand, in accordance with the above mentioned Example 1, a descending stroke of the upper mold 5 is limited in order to produce a molded glass with a predetermined thickness, and the side surface of the glass preform 3 cannot be in contact with the stopper 7.

EXAMPLE 3

Figure 4:
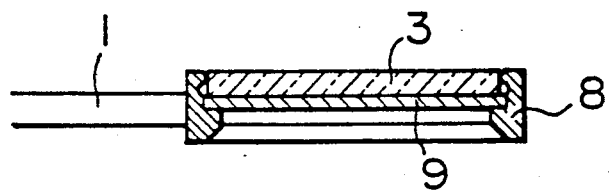
FIG. 4 is a sectional view through a mold assembly undergoing heating according to Example 3 of the present invention.
Figure 5:
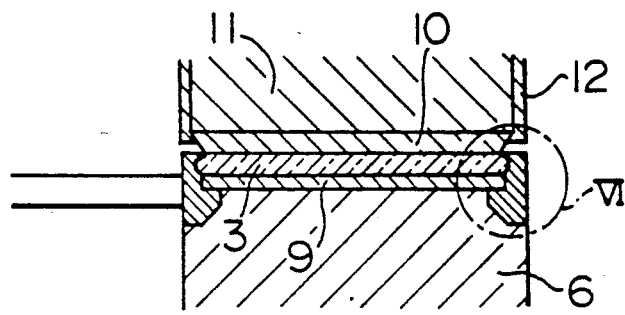
FIG. 5 is a sectional view through the mold assembly of FIG. 4 during pressing according to Example 3.
Figure 6:
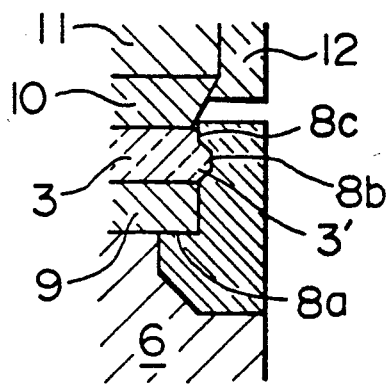
FIG. 6 is an enlarged view of the encircled portion VI of FIG. 5.

In Example 3 of the present invention shown in FIGS. 4 through 6, an upper mold 10 is pregrooved and a lower mold 9 is flat. FIG. 4 illustrates a heating condition, while FIG. 5 illustrates a pressing condition. FIG. 6 is an enlarged view of the portion IV encircled with a dashed line of FIG. 5. In this Example, a support 1 is connected to a transfer means, e.g., rotatable table. A shoulder 8a of a ring-shaped mold 8 (made of a tungsten alloy) mounted to the support 1 supports a lower mold 9 in the form of sheet. The lower mold 9 and the glass preform 3 thereon is transferred to a predetermined position at which heating, pressing and cooling operations on the glass preform 3 are carried out. In addition, an intermediate portion 8b of the ring-shaped mold 8 which portion defines the side surface of the molded glass includes a recess a diameter (i.e., a bore diameter of the intermediate portion 8b) of which is 50 to 1,000 $\mu$m greater than a bore diameter of an upper portion 8c of the ring-shaped mold 8.

The glass preform 3, the lower mold 9 and the ring-shaped mold 8 are heated in a heating chamber so that the viscosity of the glass preform 3 becomes about $10^{7.5}$ poises, and then transferred to a pressing chamber holding the upper mold 10, an upper base 11, an upper mold support fitting 12 and a lower base 6 at a temperature (557° C.) corresponding to a $10^{11}$ poise glass viscosity. In the pressing chamber, the lower base 6 is elevated, and a combination of the upper mold 10, the upper base 11 and the upper mold support fitting 12 is descended to conduct pressing for one minute. By this pressing, the glass preform 3 is extended so that a glass portion 3' is filled into the recessed intermediate portion 8b. Then a combination of the upper mold 10, the upper base 11 and the upper mold support fitting 12 is elevated and the lower base 6 is descended. During this time, the glass preform 3 will not adhere to the upper mold 10 and be elevated because the glass portion 3' is filled into the recessed intermediate portion 8b of the ring-shaped mold 8. Then, a cooling step is carried out in a cooling chamber. After a lift rod (not shown) having a diameter smaller than the ring-shaped mold 8 lifts up the lower mold 9 and the molded glass 3, the lower mold 9 and the molded glass 3 which has been placed on the lower mold 9 are together taken out of the cooling chamber or only the molded glass 3 is taken out of the cooling chamber by a suitable means. Since a shrinkage coefficient of the molded glass 3 is greater than that of the ring-shaped mold 8, a diameter of the glass portion 3' after cooling is smaller than the inner diameter of the upper portion 8c of the ring-shaped mold 8, so that the molded glass 3 and the lower mold 9 can be readily released from the ring-shaped mold 8. The resulting molded glass 3 of Example 3 was as good as that of Example 1.

EXAMPLE 4

Figure 7:
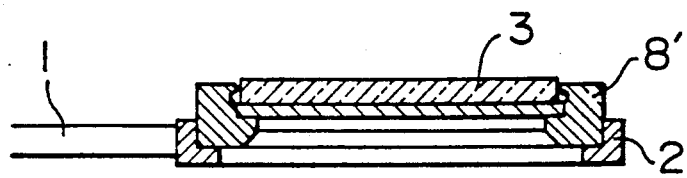
FIG. 7 is a sectional view through a mold assembly undergoing heating according to Example 4 of the present invention.
Figure 8:
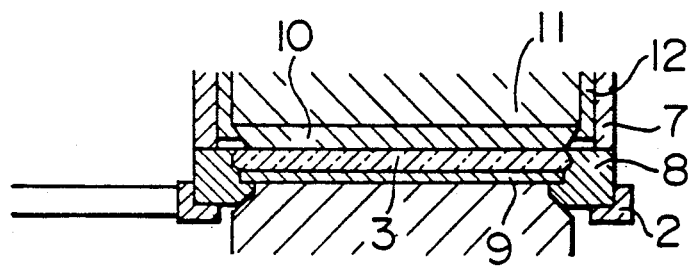
FIG. 8 is a sectional view through the mold assembly of FIG. 7 during pressing according to Example 4.

FIGS. 7 and 8 respectively illustrate cooling and pressing operations in accordance with Example 4. Example 4 is different from Example 3 in that a ring-shaped mold 8' is separated from the support 1 so that the ring-shaped mold 8' can be transferred together with the molded glass 3 and the lower mold 9. This arrangement may be more easily to handle. In accordance with this arrangement, a stopper 7 depressing the ring-shaped mold 8' is provided in order to prevent the molded glass 3, the lower mold 9 and the ring-shaped mold 8' from together lifting because the molded glass 3 adheres to the upper mold 10 when the upper mold 10 lifts after pressing. Other procedures were the same as those of Example 3 and a good result was obtained.

EXAMPLE 5

Figure 9:
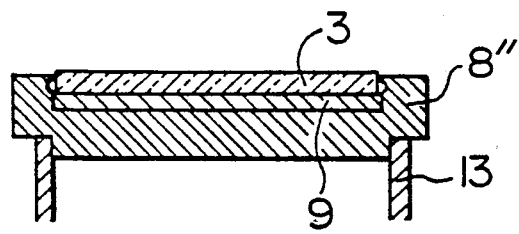
FIG. 9 is a sectional view through a mold assembly undergoing heating according to Example 5 of the present invention.
Figure 10:
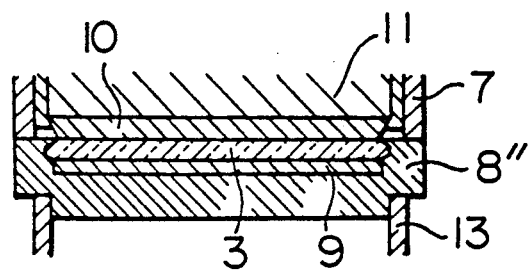
FIG. 10 is a sectional view through the mold assembly of FIG. 9 during pressing according to Example 5.

FIGS. 9 and 10 respectively illustrate cooling and pressing operations in accordance with Example 5. In Example 5, a support tube 13 is employed instead of the support 1. The support tube 13 transfers the molded glass 3, the lower mold 9 and a ring-shaped mold 8'' during heating chambers, a pressing chamber and a cooling chamber. In a first heating chamber, the glass preform 3 is preheated by heating from above and side and in a second chamber, the glass preform 3 is heated concentratively from above so that the viscosity of a surface area of the glass preform 3 becomes about $10^{6.5}$ poises. The pressing is carred out in the pressing chamber with the upper mold 10 (mold with micropatterns) held at a temperature (514° C.) corresponding to a $10^{12.5}$ poise glass viscosity. After cooling in the cooling chamber, the molded glass 3, the ring-shaped mold 8'' and the lower mold 9 are together taken out of the cooling chamber. A bottom surface area of the resulting molded glass is not almost extended by pressing, however, a good result was obtained because a corresponding glass material to be molded was previously polished.

EXAMPLE 6

Figure 11:
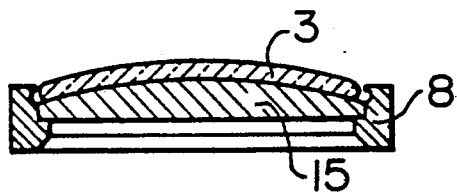
FIG. 11 is a sectional view through a mold assembly undergoing heating for producing a spectacle lens according to Example 6 of the present invention.
Figure 12:
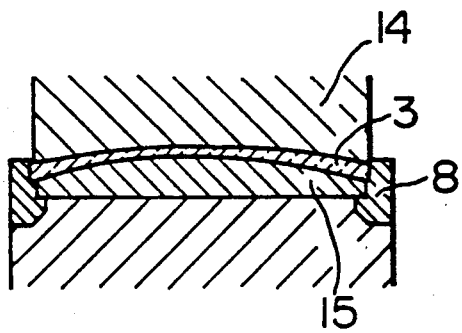
FIG. 12 is a sectional view through the mold assembly of FIG. 11 during pressing according to Example 6.

The mold assembly shown in FIGS. 11 and 12 serves to mold a spectacle lens having a 72 mm diameter. An upper mold 14 and a lower mold 15 used were produced by coating a surface of a sintered silicon carbide with silicon carbide by CVD method and then polishing in a curved surface (spherical or aspherical surface), and coating the curved surface with a 500 Å thick hard carbon layer by sputtering method. A glass having a composition of a spectacle lens and roughly surface-polished was employed as the glass preform 3. Example 6 is an example of molding a concave-meniscus-shaped spectacle lens. FIG. 11 illustrates a condition prior to pressing. FIG. 12 illustrates a condition under pressing. The center portion of a lower mold 15 has a 6 mm thickness. The structure of a ring-shaped mold 8 is the same as in Example 3. By heating in the heating chamber a glass preform 3 to be about $10^{6.5}$ poises, the glass preform 3 transforms due to its weight so that the shape of the glass preform 3 copies the shape of the lower mold 15 as shown in FIG. 11. As shown in FIG. 12, the pressing is carried out for about 1 minute with an upper mold 14 held at a temperature corresponding to a $10^{12}$ poise glass viscosity. The surface roughness of the molded glass 3 obtained after cooling is below or equal to 100 Å. Both the upper and lower surfaces of the glass preform 3 have a good surface accuracy. The warpage of the molded glass 3 is below or equal to 10 $\mu$m. The finally obtained molded glass 3 has a sufficient quality for a spectacle lens.

EXAMPLE 7

Figure 13:
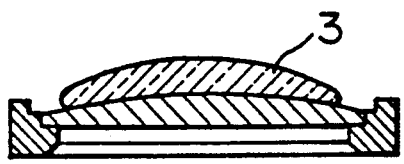
FIG. 13 is a sectional view through the mold assembly undergoing heating according to Example 7 of the present invention.
Figure 14:
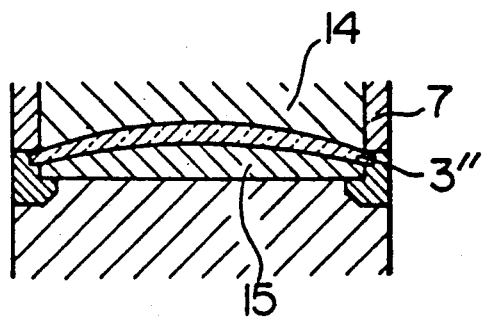
FIG. 14 is a sectional view through the mold assembly of FIG. 13 during pressing according to Example 7.
Figure 15:
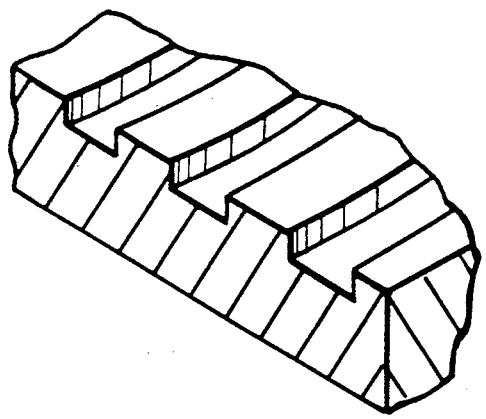
FIGS. 15 and 16 are enlarged fragmentary perspective views illustrating microgrooves and micropits in the surface of the molded glass.
Figure 16:
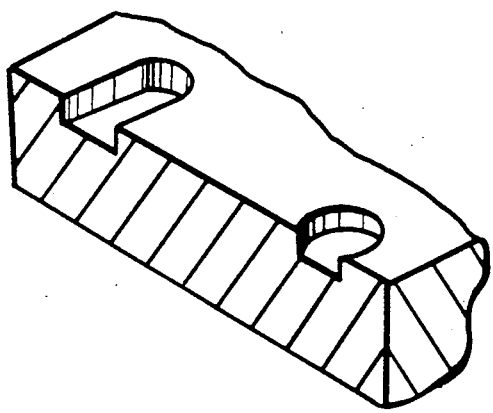

The mold assembly shown in FIGS. 13 and 14 serves to mold a convex-meniscus-shaped spectacle lens. FIG. 13 illustrates a condition prior to pressing. FIG. 14 illustrates a condition under pressing. The characteristic of Example 7 is that a glass preform to 3 is heated in a heating chamber to a $10^{5.5}$ poise viscosity so that the glass preform 3 becomes slightly rounded due to its surface tension. This prevented a gas from being trapped in the upper surface of the glass preform 3 during pressing. As shown in FIG. 14, in accordance with Example 7, depressing the periphery of the molded glass 3 by the stopper 7 prevents the molded glass 3 from adhering to the upper mold 14 when the upper mold 14 lifts.

The mold assembly of the present invention, which is described in the above Examples, can be used with various molded-glass producing apparatuses. That is, the molded-glass producing apparatuses may include a type in which the glass to be molded is transferred from a heating chamber to a pressing chamber and a cooling chamber in this order (including a rotation type molded-glass producing apparatus with a rotatable table, a line type molded-glass producing apparatus with a tunnel furnace, and the like), and may include another type in which the heating, pressing and cooling of the glass preform are carried out at one place.

In addition, a material for the mold, a composition and shape of the glass preform, and a press time are not restricted to the above-described Examples.

The present invention is effective to a production of a relatively thin and highly accurate molded-glass by means of a thin lower mold. The effective press time is from 20 seconds to 120 seconds.

According to the present invention, the glass preform is placed on the thin lower mold, transferred together with the lower mold, and heated so that a sagging in the glass preform due to its softening is prevented. A low heat capacity of the thin lower mold contributes to (i) rapid heating of the glass preform and the lower mold, (ii) rapid heat reception of the upper mold and the lower base from the glass preform and the lower mold during pressing, and (iii) rapid cooling of the glass preform and the lower mold after pressing. Consequently, a relatively thin molded glass having a large diameter can be produced.

In particular, when pregrooved optical disc substrates are produced, various lower molds having an equal diameter and thickness but different micropatterns are sequentially placed in the molded-glass producing apparatus, so that optical disc substrates having the different micropatterns can be sequentially produced under an equal molding condition.

In addition, when spectacle lenses are produced, lower molds are sequentially exchanged so that degrees of the spectacle lenses can be changed. This is very effective to a production of a spectacle lens.

What is claimed is:

1. A mold assembly for producing a thin molded glass article from a glass preform, comprising:

an upper mold having a circular molding surface having an outer diameter;

a lower mold having a circular molding surface having an outer diameter, said circular molding surface of said lower mold facing toward said circular molding surface of said upper mold, enabling the glass preform to be received therebetween;

at least one of said upper and lower molds being movable toward one another;

said circular molding surfaces of the respective upper and lower molds cooperating with each other, when the at least one of said upper and lower molds is moved toward the other, to clamp the glass preform received therebetween and press the glass preform into said molded glass article;

said lower mold having a maximum thickness at most equal to 1/10 of said outer diameter of said lower mold; and a third mold for disposition between said upper and lower molds and having a bore including an upper portion having an inner diameter, an intermediate portion including an annular recess having an inner diameter at least about 50 $\mu$m greater than said inner diameter of said upper portion for receiving a portion of the glass preform in response to pressing thereof between said upper and lower molds thereby preventing said molded glass article from adhering to said molding surface of said upper mold, and a lower portion whose inner surface is formed with a shoulder for supporting said lower mold.

2. The mold assembly according to claim 1, further including a lower base, said third mold being mounted on said lower base, and a support, said third mold being mounted to said support.

3. The mold assembly according to claim 1, further including a stopper arranged about said upper mold for preventing elevation of said third mold when said upper mold is displaced upwardly after pressing said glass preform.

4. The mold assembly according to claim 1, wherein at least one of said upper and lower molds has a silicon carbide layer and an outermost hardened carbon layer on said silicon carbide layer, said hardened carbon layer forming the molding surface of said one mold.

5. The mold assembly according to claim 1 wherein the molding surface of at least one of said upper and lower molds includes microgrooves and/or micropits arranged in a predetermined pattern.

6. A mold assembly for producing a thin molded glass article from a glass preform, comprising:

an upper mold having a circular molding surface having an outer diameter;

a lower mold having a circular molding surface having an outer diameter, said circular molding surface of said lower mold facing toward said circular molding surface of said upper mold, enabling the glass preform to be received therebetween;

at least one of said upper and lower molds being movable toward the other;

said circular molding surfaces of the respective upper and lower molds cooperating with each other, when the at least one of said upper and lower molds is moved toward the other, to clamp the glass preform received therebetween and press the glass preform into said molded glass article;

said lower mold having its maximum thickness at most equal to 1/10 of said outer diameter of said lower mold;

a ring mold for supporting a peripheral edge of said lower mold;

a lower base inserted in said ring mold for supporting the latter; and a stopper arranged about said upper mold for preventing elevation of said molded glass article with said upper mold when the latter is moved upwardly after pressing said glass preform.

7. The mold assembly according to claim 6, wherein at least one of said upper and lower molds has a silicon carbide layer and an outermost hardened carbon layer on said silicon carbide layer, said hardened carbon layer forming the molding surface of said one mold.

8. The mold assembly according to claim 6, wherein said stopper has an inner surface in contact with a peripheral side surface of the glass preform during pressing thereof.

9. The mold assembly according to claim 6, wherein said stopper has a lower end which is adapted to press down the peripheral edge of said lower mold and said glass preform during pressing thereof.

10. The mold assembly according to claim 6, wherein the molding surface of at least one of said upper and lower molds includes microgrooves and/or micropits arranged in a predetermined pattern.

11. The mold assembly according to claim 6, further including a lower base, said ring mold being mounted on said lower base, and a support, said ring mold being mounted to said support.

12. The mold assembly according to claim 6 wherein said stopper has a surface engageable with said ring mold to prevent elevation of said molded glass article with said upper mold when the latter is moved upwardly after pressing said glass preform.

13. A method for producing a thin, molded glass article, comprising the steps of:
disposing a glass preform on a first molding surface between said first molding surface and a second molding surface and within a third molding surface encompassing said glass preform, said third molding surface having an internal recess;
heating the glass preform on the first molding surface;
pressing the heated glass preform between said first and second molding surfaces and within said third molding surface to mold the glass article with portions thereof being received in the recess of said third molding surface in response to pressing thereof; and
relatively displacing one of said first and second mold surfaces away from the other to free said molded glass article therefrom while simultaneously maintaining said molded glass article portions in said recess to preclude adherence between said article and said one of said first and second mold surfaces.

14. A method according to claim 13, including the step of, after displacing said one of said first and second mold surfaces away from the other, cooling and thereby shrinking said molded glass article sufficiently to withdraw the portions thereof in said recess to enable release of said article from said third mold surface.

15. A method for producing a thin, molded glass article, comprising the steps of:
disposing a glass preform on a first molding surface between said first molding surface and a second molding surface and within a third molding surface encompassing said glass preform;
heating the glass preform on the first molding surface;
pressing the heated glass preform between said first and second molding surfaces and within said third molding surface to mold the glass article between said first and second molding surfaces;
displacing said second molding surface and said molded glass article relative to one another to free said molded glass article therefrom; and
engaging the molded glass article with a stopper to prevent displacement of said molded glass article with said second molding surface upon relative displacement of said glass article and said second molding surface.

16. A method according to claim 15, including the step of engaging the stopper against marginal portions of said glass article.

17. A method according to claim 15, including the step of engaging the stopper against said third molding surface.

* * * * *